Patented Jan. 3, 1950

2,493,645

UNITED STATES PATENT OFFICE 2,493,645

NICOTINIC ACID - β - PICOLYL - AMIDE AND PROCESS FOR THE MANUFACTURE THEREOF

Reinhard Schläpfer, Basel, Switzerland, assignor to Hoffmann-La Roche Inc., Nutley, N. J., a corporation of New Jersey No Drawing. Application April 23, 1948, Serial No. 22,954. In Switzerland May 21, 1947

1 Claim. (Cl. 260—295.5)

Among the known nicotinic acid amides derived from primary amines there are only few compounds with distinct pharmacological properties. Some nicotinic acid-monoalkylamides and -aralkylamides are known to possess spasmolytic activity which, occasionally, is accompanied by a weak lowering of the blood pressure by action on the central nervous system.

Only few acyl derivatives of β-picolylamines have been described and no such compounds of pharmacological interest are known.

Surprisingly it was now discovered that nicotinic acid-β-picolylamide of the following formula

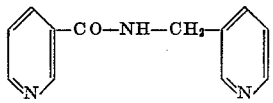

is a compound which is able to produce a strong and protracted lowering of the blood pressure while being of very low toxicity. This lowering of the blood pressure is of peripheral origin and distinctly different from the rather weak and irregular action of central origin which other nicotinic acid-monoalkyl- and -aralkylamides have on blood circulation. The activity of nicotinic-β-picolylamide in lowering the blood pressure is a typical property of this compound and is not paralleled by any activity of other kind.

The preparation of the nicotinic acid-β-picolylamide may be effected by any usual method for the preparation of acid amides, i. e., reacting β-picolyl-amine or a salt thereof with a functional derivative of nicotinic acid, such as the chloride, anhydride, amide or an ester thereof.

Nicotinic acid-β-picolyl-amide consists of colourless crystals of melting point 108° C. It is easily soluble in water, alcohol chloroform and hot benzene, less soluble in cold benzene; it is sparingly soluble in petroleum ether.

Nicotinic acid-β-picolyl-amide may be used as a medicinal substance.

Example 1

20.9 parts by weight of β-picolylamine are dissolved in 50 parts by volume of anhydrous ether. A solution of 14.1 parts by weight of nicotinic acid chloride in 100 parts by volume of anhydrous ether is added while cooling with ice. After refluxing for 1 hour the mixture is cooled down, the ether is poured off, the residue is taken up in little water and decolourised with active charcoal. The solution is saturated with potassium carbonate and extracted with chloroform. The extract is dried with potassium carbonate and the solvent is evaporated under partial vacuo. When left to stand over sulfuric acid in an exsiccator the oily residue solidifies in the form of crystals. Purification may be effected by taking up in chloroform, adding petroleum ether until the solution begins to turn turbid and adding a few seed crystals; the colourless crystals of nicotinic acid β-picolyl-amide which now precipitate melt at 108° C. The yield is 75 per cent. of the theoretical.

Example 2

54 parts by weight of β-picolylamine-dichlorohydrate and 44 parts by weight of nicotinic acid chloride are heated for 2½ hours to 170–180° C. in an open flask while excluding moisture. After cooling down to room temperature the crystalcake is dissolved in a just sufficient quantity of water, the solution is saturated with potassium carbonate and thoroughly extracted with chloroform. The united chloroform solutions are dried with potassium carbonate whereupon the solvent is driven off under a partial vacuo. The crystalline residue is dissolved in 100 parts by volume of chloroform and decolourised by means of charcoal whereupon low boiling petroleum ether is added until the solution begins to turn turbid, thus causing crystallisation of nicotinic acid β-picolylamide. The yield amounts to 80 per cent. of the theoretical.

Example 3

32.4 parts by weight of β-picolylamine together with 36.6 parts by weight of nicotinic acid amide are heated to 180° C. while introducing nitrogen and are kept at the said temperature for 29 hours. Thereafter, unreacted β-picolylamide is distilled off under the vacuo of a water jet pump. The residue is taken up in 100 parts by volume of water, the solution is saturated with potassium carbonate and extracted with chloroform. After drying the chloroform solutions with potassium carbonate the solvent is removed under a partial vacuo. The crystalline residue is stirred up in the cold with 60 parts by volume of chloroform, the mixture is filtered, whereby 10.5 parts by weight of nicotinic acid amide are retained. The yellow chloroform solution is concentrated to 40 parts by volume, petroleum ether is added until turbidity sets in and seed crystals are placed in the solution. The nicotinic acid-β-picolyl-amide precipitating in the cold may suitably be purified by dissolving in benzene, decolourising with animal charcoal and allowing to recrystallise. The yield is 49 per cent. of the theoretical.

Example 4

54 parts by weight of β-picolylamine together with 68 parts by weight of nicotinic acid methylester are heated during 10 hours in an oil bath of 160° C. while introducing nitrogen. After cooling down the nicotinic acid-β-picolyl-amide is first worked up by the method described above in Example 1. The oil remaining behind after evaporation of the chloroform solution is distilled in high vacuo. The fractions boiling above 160° C. under a pressure of 0.1 mm. Hg are dissolved in benzene. The solution is decolourised with charcoal and seeded. The crystals of nicotinic acid-β-picolyl-amide thus precipitating are easily soluble in water as well as in alcohol and chloroform. The yield amounts to 33.8 per cent. of the theoretical.

I claim:

Nicotinic acid-β-picolyl-amide represented by the formula

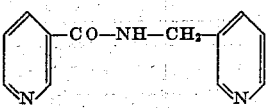

REINHARD SCHLÄPFER.

REFERENCES CITED

The following references are of record in the file of this patent:

UNITED STATES PATENTS

| Number | Name | Date |
|---|---|---|
| 1,403,117 | Hartman | Jan. 10, 1922 |
| 2,186,769 | Schirm | Jan. 9, 1940 |

FOREIGN PATENTS

| Number | Country | Date |
|---|---|---|
| 824,042 | France | 1938 |

OTHER REFERENCES

Badgett, J. American Chem. Society, July 1945, pp. 1135–1138.